United States Patent [19]

Koike

[11] Patent Number: 4,694,445

[45] Date of Patent: Sep. 15, 1987

[54] RECORD DISC REPLACING MEANS FOR A SELECTIVE PLAYING TYPE SOUND REPRODUCING DEVICE

[75] Inventor: Eishi Koike, Sagamihara, Japan

[73] Assignee: Ozen Corporation, Tokyo, Japan

[21] Appl. No.: 917,218

[22] Filed: Oct. 9, 1986

[30] Foreign Application Priority Data

Nov. 20, 1985 [JP] Japan .................................. 60-260947

[51] Int. Cl.$^4$ .......................... G11B 3/08; G11B 3/40; G11B 3/78; G11B 19/20

[52] U.S. Cl. ........................................ 369/65; 369/63; 369/67

[58] Field of Search .......................... 369/63, 65, 67, 66

[56] References Cited

U.S. PATENT DOCUMENTS

| 4,373,199 | 2/1983 | Watanabe | 369/65 |
| 4,574,370 | 3/1986 | Koike | 369/63 |
| 4,622,658 | 11/1986 | Koike | 369/63 |
| 4,648,086 | 3/1987 | Koike | 369/63 |

FOREIGN PATENT DOCUMENTS 2147447  5/1985  United Kingdom .................. 369/63

*Primary Examiner*—Steven L. Stephan

*Attorney, Agent, or Firm*—Basile, Weintraub & Hanlon

[57] ABSTRACT

A slit for inserting a record disc is formed to extend from one side of the casing toward the other side so as to establish continuous communication between both sides and being parallel to the record disc carrying face of the turn table. A sound transmitting member carries a pair of stylus force releasing projections, and within the casing, a centering projection is resiliently supported and aforesaid stylus force releasing projections are disposed at the inlet portion of the slit for inserting a record disc, at the further interior part of this slit, the centering projection is positioned so that the centering projection and the stylus force releasing projections can be extended to intersect the slit for inserting a record disc. An ejector lever is also provided, which is disposed capable of being depressed form outside of the casing and extends into the record disc inserting slit and is able to eject, when depressed, both the stylus force releasing projections and the record disc being in engagement with the centering projection. A resiliently protruding record disc locking projection is disposed on the record disc carrying face, while the record disc is formed to have a notch engageable with the record disc locking projection.

3 Claims, 8 Drawing Figures

RECORD DISC REPLACING MEANS FOR A SELECTIVE PLAYING TYPE SOUND REPRODUCING DEVICE

BACKGROUND OF THE INVENTION

1. Field of the Invention:

This invention relates to a record disc replacing device for a selective playing type sound reproducing device.

More particularly, this invention relates to a means for replacing a record disc having a pair of record disc inserting slits defining a continuous space extending between the slits, one at one side and the other one at the opposite side, respectively, of the casing of the sound reproducing device and being parallel to the record carrying face of the turn table; that a sound transmitting member carries a pair of stylus force releasing projections, and the cusing is provided therein with a resiliently supported centering projection and said stylus force releasing projections are disposed at the inlet of each record disc inserting slits and said centering projection is disposed at the interior of each record disc inserting slits so that the centering projection and said stylus force releasing projections, respectively, are rendered to intersect the space defined by the record disc inserting slits; that an ejector lever extending in the record disc inserting slit is disposed being operable for its depression from outside the casing so as to eject both the stylus force releasing projection and the record disc under engagement with said centering projection by aforesaid depression; that the record disc carrying face of the turn table is provided with a record disc locking projection which resiliently protrude above the record carrying face and that the record disc is provided with a notch engageable with said record disc locking projection; thereby the sound reproduction device, even if it is of the type using a plurality of selection poles, can replace any desired record disc among record discs without rolying on such means as an open and closing type record holder.

2. Prior Art

Heretofore, various sound reproducing devices have been conceived by and patent protection sough by the present inventor. These relate to selective playing type sound reproducing devices having a replaceable disc and also to item-selective reproduction type devices. There have been disclosed devices which are capable of replacing record discs using an open and closing type record disc holder and selecting recorded items by selection poles. See, for example, Japanese Patent Publication No. 56(1981)-53819, Laid-open Patent Publication No. 56(1981)-130808, U.S. Pat. Nos. 4,373,177, 8,388,808 and Japanese Patent Application No. 59(1984)-25860.

However, in reproducing devices which employ an open and close type record disc holder for replacing record discs and selecting poles for selective reproduction, it is necessary to either open a swingable cover lid of the casing to expose the turn table of the reproducing device in changing record discs or to swingably attach a record holder to the casing itself and to open or close the casing each time the record disc is to be changed. Placing and removal of the record disc is troublesome in devices which employ a swingable cover lid; while the latter device involves difficulty in opening and closing the record holder.

Accordingly, it is desirable to provide a selective playing sound reproducing device which permits the user to easily change from one record disc having a plurality of recorded grooves to another; the sound reproducing device being capable of reproducing any desired recorded items merely by user's depressing of the selection poles. It is also desirable to provide a sound reproducing device which is capable of selective sound reproduction of the record disc of a variety of separate discs which is simply constructed and ready operation.

SUMMARY OF THE INVENTION

In view of the problems encountered in the prior art devices, the present invention provides a device, which is able to readily replace or change record discs by merely inserting a desired record disc having a plurality of record grooves into a slit formed in the casing of the device itself, and at the same time to perform selective sound reproduction by using selection poles.

The slit formed in the casing of the reproducing device for inserting a record disc communicates from one side of the casing to the other side of the casing of the reproducing device and is oriented so as to be parallel to the record carrying face of a turn table carried within the casing.

Also located within the casing is a sound transmitting member which carries a stylus force releasing projection. In the casing, there is also disposed a resiliently supported centering projection. The stylus force releasing projection is located at the inlet portion of the record disc insertion slit while the centering projection is located at the interior of the record disc insertion slit such that each of them, respectively, can intersect the record disc insertion slit.

An ejector lever extends into the record disc insertion slit. The user can depress the ejector lever from outside the casing so as to eject both the stylus force releasing projection and the record disc which is engaged by the centering projection. In the present invention, the record disc carrying face of the turn table is provided with a record disc locking projection. The record disc to be inserted has a notch engageable with aforesaid record disc locking projection to maintain the record disc in position.

In operation, when a record disc is inserted into the record disc insertion slit, the inserted record disc, firstly, raises the sound transmitting member by pushing the stylus force releasing projection. This action releases stylus force imparted through the pickup and permits the pickup to return to the starting point of sound reproduction. This allows the power source to supply power to the motor for rotating the turn table, and permits the record disc to be centered by the centering projection once the record disc is fully inserted into the slit. Upon centering, the notch cut in the record disc engages the record disc locking projection which resiliently protrudes above the record disc carrying face of the turn table. This helps to maintain the record disc in position on the turn table and prevents slippage as the two rotate.

The pickup will engage only one of the recorded groove which was selected for reproduction. Once reproduction of the item is finished and the pickup comes to the end point of sound reproduction, the power to the motor rotating the turn table is cut off.

Subsequent depression of any one of the selection poles will release the stylus force again, resulting in return of the pickup to the starting point of sound reproduction and supply of power to the motor. This permits integral rotation of the turn table and the record disc. While the selection pole is still depressed, a stopper projecting from the side periphery of the turn table will strike the depressed selection pole and temporarily stop the turn table. Release of the depressed selection pole imparts stylus force to the pickup and releases the stopper permitting the turn table to resume rotation. In this way, the pickup is allowed to engage the true recorded groove selected by the specific selection pole. Depression of the ejector lever will give rise to the depression on the peripheral face of the record disc and the stylus force releasing projection, which will eject the record disc outside the casing.

BRIEF DESCRIPTION OF THE DRAWINGS

The present invention can be better understood by reference to the following drawings in which like reference numerals refer to like elements throughout the several views and in which.

DETAILED DESCRIPTION OF THE PREFERRED EMBODIMENTS

Figure 1:
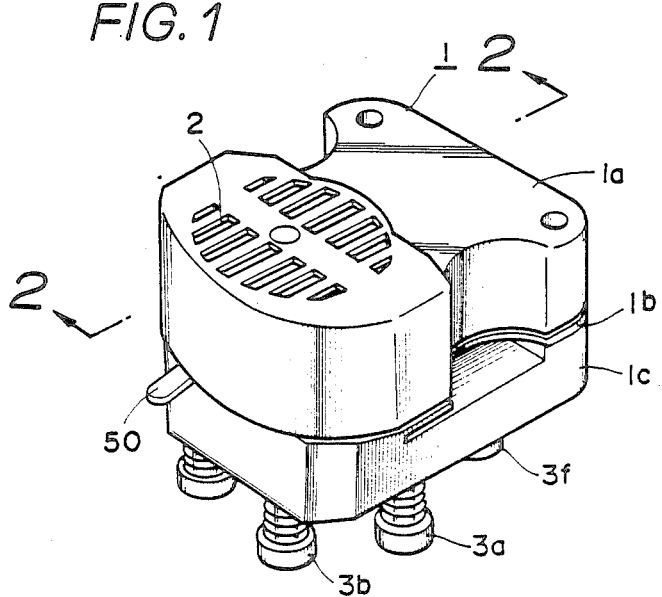
FIG. 1 is a perspective view of a sound reproducing device in accordance with the present invention.
Figure 2:
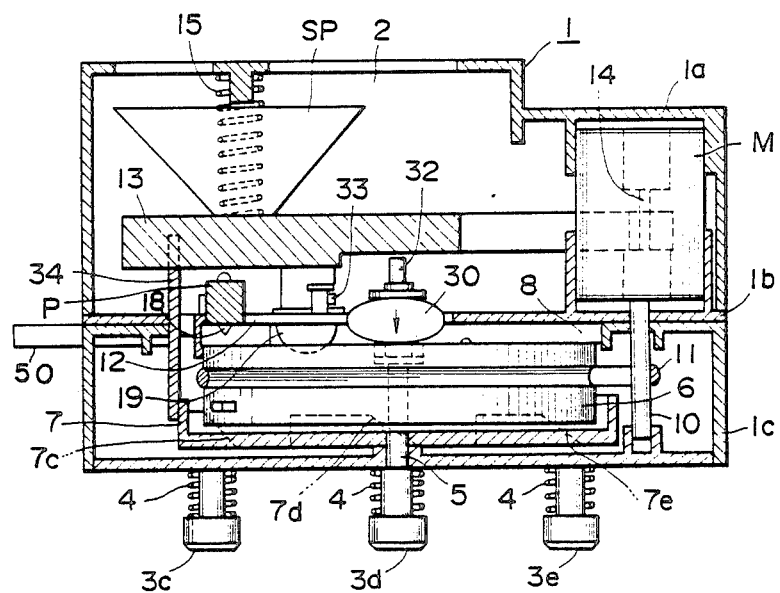
FIG. 2 is a sectional view taken along line 2—2 of FIG. 1.
Figure 3:
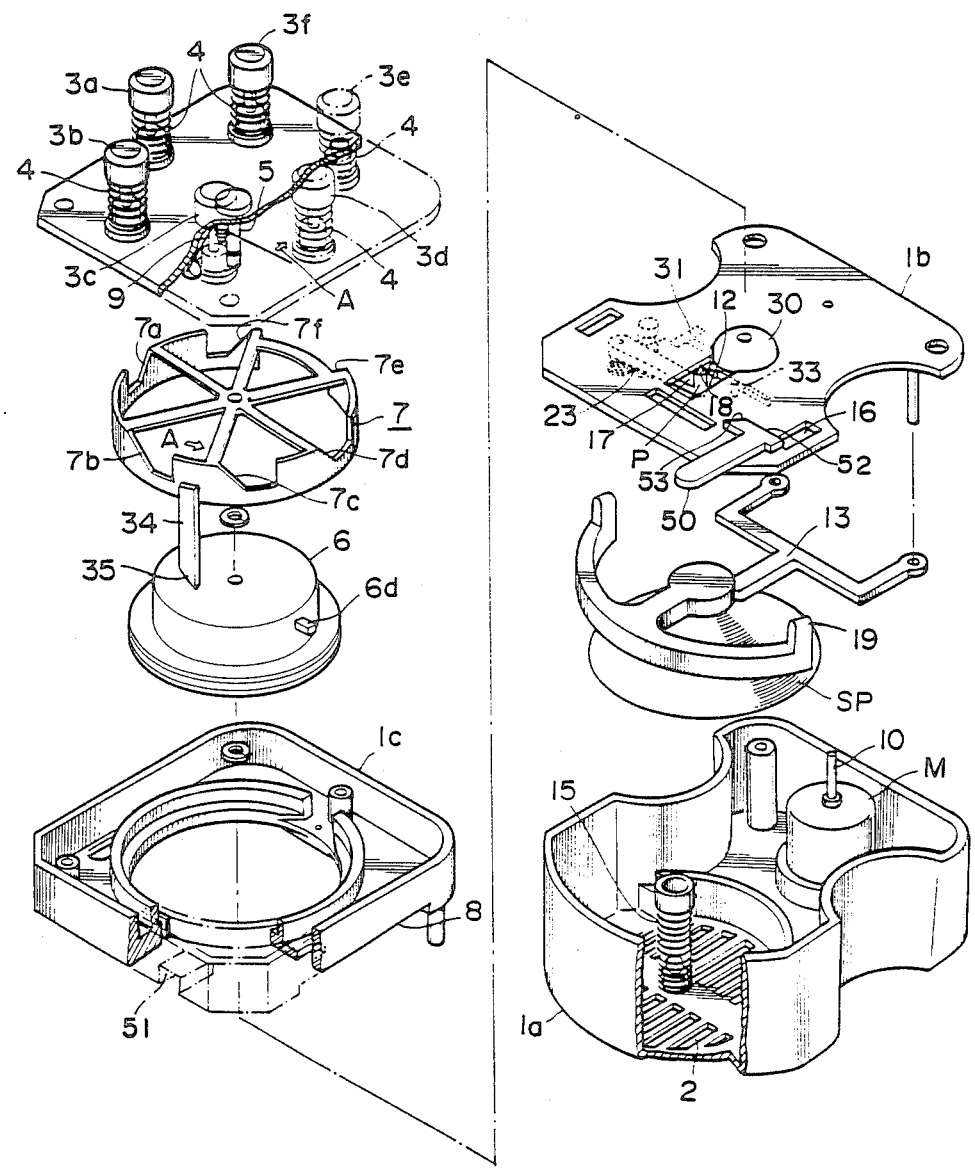
FIG. 3 is a fragmented perspective view.

The present invention, as shown in FIGS. 1, 2 and 3, has a casing 1 which consists of a housing 1a at the upper part thereof, a chassis plate 1b disposed immediately below the housing and a base box 1c disposed further below the chassis plate. Formed in the housing 1a is a speaker box 2, within which a speaker diaphragm SP is received.

Within the base box 1c, six selection poles, 3a, 3b, 3c, 3d, 3e and 3f are retained, as particularly shown in FIG. 3, so that they can be depressed for insertion thereof to the interior of the casing 1. Each of these selection poles 3a, 3b, 3c, 3d, 3e and 3f is normally urged outward by respective coil spring 4 which is attached being compressed, to the neck of each selection pole.

There is disposed, within the base box 1c, a center pin 5 standing upright. A turn table 6 having a record disc carrying face and a stylus force releasing ring 7 are journally received around the center pin 5 permitted respective free rotation.

The base box 1c is recessed at two opposite sides thereof between the base box 1c and the chassis plate 1b so that the top plate of the base box 1c can be bent away from the chassis plate 1b to constitute a pair of slits 8, for inserting a record disc therethrough, which communicate from one side to the other side of the casing 1. These slits 8 for inserting a record disc, extend parallel to and communicate with the record disc carrying face of the turn table 6.

Figure 4:
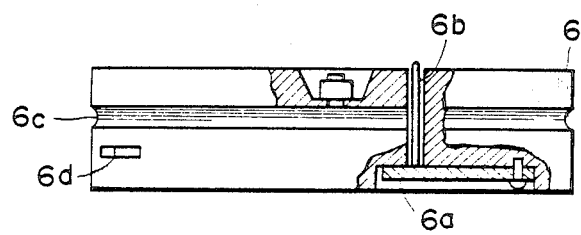
FIG. 4 is a partly cut-away side view of a turn table.
Figure 5:
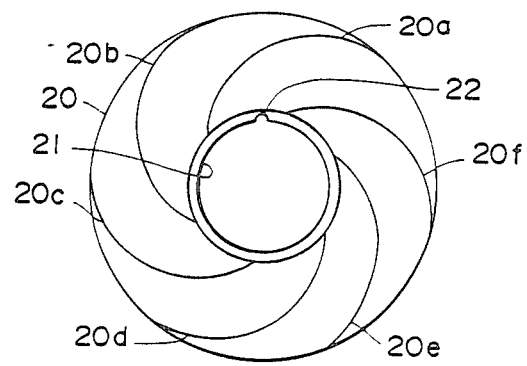
FIG. 5 is a plan view of a record disc according to the present invention.

As shown in FIG. 4, the turn table 6 has on its record disc carrying face, a projection 6b for locking a record disc. The projection 6b is resiliently supported on its reverse face by a leaf spring 6a. The locking projection 6b is adjacent to the central part of the turn table 6. The tip end of the locking projection 6b has a hemispherical surface. There are provided on the peripheral side face of turn table 6, a groove 6c which functions as a pulley groove and a stopper 6d whose function will be described in greater detail subsequently.

Figure 6:
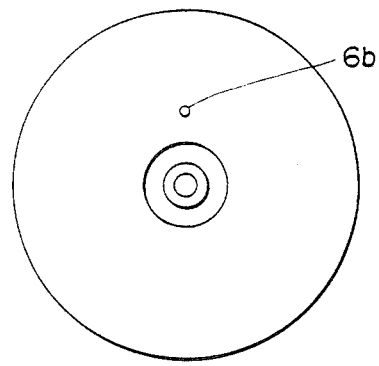
FIG. 6 is a plan view of a turn table of the present invention.

A record disc 20 as shown in FIG. 6 is inserted through the record disc insertion slit 8 into the casing 1 and is placed on the record disc carrying face of the turn table 6. The record disc 20 preferably has six record grooves, 20a, 20b, 20c, 20d, 20e and 20f each having a separate recording. Furthermore, the record disc 20 has a centering opening 21 for centering the record disc on the turn table and a notch 22 located at a part of the inner periphery of the opening 21 and capable of engaging with the projection 6b for locking the record disc 20.

As clearly shown in FIG. 3, the stylus force releasing ring 7 comprises inclined faces 7a, 7b, 7c, 7d, 7e and 7f corresponding in number to the selection poles 3a, 3b, 3c, 3d, 3e and 3f. The inclined faces 7a, 7b, 7c, 7d, 7e and 7f also facing toward the axial direction of the device. The above-mentioned selection poles 3a, 3b, 3c, 3d, 3e and 3f are arranged to strike against these inclined faces 7a, 7b, 7c, 7d, 7e and 7f.

Aforesaid selection poles 3a, 3b, 3c, 3d, 3e and 3f are arranged such that, when a given pole is depressed against the biasing force of the respective coil spring 4, to urge the inclined faces 7a, 7b, 7c, 7d, 7e and 7f on, respectively, so as to rotate the stylus force releasing ring 7. At the same time, the selection poles are positioned to intersect the plane along which the stopper 6d rotates. A spring 9 is retained on the bottom of the base box 1c for urging the stylus force releasing ring 7 in the direction to which the inclined faces 7a, 7b, 7c, 7d, 7e and 7f face. The spring 9 engages the stylus force releasing ring 7 from the direction shown by the arrow line A, as particularly shown in FIG. 3. Accordingly, operator's depression of any one of the selection poles 3a, 3b, 3c, 3d, 3e and 3f will contact the respective inclined face and result in rotation of the stylus force releasing ring 7 against the biasing force imparted by the spring 9.

A motor M is mounted on the chassis plate 1b. As shown in FIG. 2, the output shaft 10 of the motor M passes through the chassis plate 1b and the upper plate of the base box 1c and extends further up to the position where it can face the groove 6c formed around the side periphery of the turn table 6. As shown in FIG. 2, a belt 11 extends between the output shaft 10 and the groove 6c of the turn table 6 to drive the turn table. Though not depicted in the drawings, it is to be understood that the manner of coupling between the output shaft and the turn table may also be accomplished by a frictional engagement such as a rim drive means.

An integrally made aperture 12 is located in chassis plate for receiving both a centering projection and a pickup. Also located in the chassis plate 1b is a pair of oblong holes 16 opened at the two opposite inlets (outlets) which permit passing through a related component through the base box 1c and further to intersect the slit 8 for inserting the record disc.

A sound transmitting member 13 has an anchor shaped forward portion and a bifurcate rear portion and is attached by attaching legs to the housing 1a such that it is disposed above the chassis plate 1b in a manner of overhanging about a pair of supporting posts 14. The above-mentioned speaker diaphragm SP is fixedly carried on this sound transmitting member 13. As shown in FIG. 2, a stylus force spring 15 is compressed between the inner face of the speaker box 2 defined in the housing 1a and the speaker diaphragm SP to bias the free end of the sound transmitting member 13 toward the record carrying face of a turn table 6.

A tone arm 17 provided with a pickup P at its forward tip end is swingably attached to the chassis plate 1b. This tone arm 17 is biased at its swingable attachment point by a return spring 23, so that the pickup P can normally be directed to the starting point of sound reproduction in the record disc 20. As shown in FIGS. 2 and 3, a sound reproduction stylus 18 located on the pickup P is directed to the recording face of the record disc 20 and is disposed through the aperture 12 to extend to the recording face of the record disc 20. In this manner, the sound reproduction stylus 18 can engage the recording face of the record disc 20, and further the pickup P contacts the record face under the force given by the sound transmitting member 13.

A pair of stylus force releasing projections 19 is disposed on each of the two hook portions of the anchor shaped part of the sound transmitting member 13. The stylus force releasing projections 19 each have a tip end which have rounded cross-sectional shapes.

Also on the chassis plate 1b, a disc-like centering projection 30 with its spherical upstanding face directed toward the center of the device, is disposed and supported so as to be resiliently advanced by a spring 31 to the level of the record disc insertion slits 8.

The aforesaid stylus force releasing projections 19 can extend to the interior of the base box 1c by passing through the oblong holes 16 and the space defined by the record disc insertion slit 8. However, the rounded tip end portion of each releasing projections 19 is still retained within the space defined by the record disc insertion slits 8.

In addition, the centering projection 30 extends to the record disc insertion slits 8 in such a manner that the center of the projection 30 can coincide with the center of the turn table 6. A pushing pole 32 is located on the opposite face of centering projection 30. The pushing pole 32 impinges upon the lower face of the sound transmitting member 13 when the centering projection 30 is raised upward by the record disc 20.

Thus, the record disc 20, firstly, raises the stylus force releasing projections 19 and thereby raises the sound transmitting member 13 to prevent any stylus force from being imparted on the pickup 1' until the time when the record disc is inserted through either one of the slits 8 for inserting the record disc and thus been laid and centered on the turn table 6.

As soon as the record disc 20 passes over the stylus force releasing projections 19 and has been positioned to the center of the turn table 6, the centering projection 30 enters into the centering hole 21 of the record disc 20. On the other hand, when the record disc 20 is moved away from the centering projection 30, the record disc 20 will raise the centering projection 30 by relying on the inner periphery of the centering hole 21. This action will, further, raise the sound transmitting member 13 by the pusher pole 32 so that no stylus force is applied to the pickup P.

Ejection of a record disc 20 outside the casing 1 is done by an ejector lever 50 shown in FIGS. 1, 2 and 3. The ejector lever 50 is positioned and guided by a guide slit formed on the chassis 1c of the casing 1, as particularly shown in FIG. 3. The ejector lever 50 can be depressed from outside and confront the innermost edge of the record disc insertion slit 8. The forward tip end of the ejector lever 50 which extends into the record disc inserting slit 8, comprises a face 52 which confronts the stylus force releasing projection 19 and a pusher face 53 which can confront the outer rotating periphery of the record disc 20 when the centering hole of the record disc is fitted around the centering projection 30. When the ejector lever is advanced by pushing it from outside, it will retract the stylus force releasing projection 19 from the record disc insertion slit 8 and the reproduction stylus 18 together. At the same time, it will urge and eject the outer periphery of the record disc 20 toward the inlet side end portion of the record disc insertion slit 8.

As shown, particularly in FIGS. 2 and 3, a switch contact 33 to the power source to the motor M, is disposed on the chassis plate 1c in a position corresponding to the end point of sound reproduction of the record disc 20 when the record disc has been centered and laid on the turn table 6 so as to open the circuit from the power source when the pickup P has arrived at the end point of sound reproduction.

A stylus force releasing pole 34 is fixed at the outer periphery of the stylus force releasing ring 7, the tip end of which is formed to have an inclined face 35 facing the direction opposite to that of the inclined faces 7a, 7b, 7c, 7d, 7e and 7f. The inclined face 35 of stylus force releasing pole 34 slidably contacts the side face at the central part of the sound transmitting member 13. When the stylus force releasing ring 7 rotates, by the operator's depression on any one of the selection poles 7a, 7b, 7c, 7d, 7e and 7f, the inclined face 35 of the stylus force releasing pole 34 will raise the sound transmitting member 13 so that the stylus force cannot be applied to the pickup P.

To operate the sound reproducing device of the present invention, a record disc 20 is inserted through the record disc insertion slit 8 while a main switch is kept OFF.

Insertion of the record disc 20 causes the stylus force to raise releasing projection 19 by means of the rounded tip end. This movement of the stylus force releasing projection 19, in turn, raises the sound transmitting member 13 and releases the stylus force applied to the pickup P. The pickup P can, then, retract from the plane on which the recorded face of the record disc is situated.

When the record disc 20 is further advanced to the portion of the record disc insertion slit 8 where the centering projection 30 can be fully received in the centering hole 21 of the record disc, the record disc 20 moves past the position where the stylus force releasing projection 19 situates, so no stylus force is applied to the pickup P. If a main switch (not shown) is turned ON, the turn table 6 will begin to rotate. However, if the notch 22 formed on the record disc 20 has not yet engaged the record disc locking projection 6b, then, both member will move with different phases of rotation until the record disc locking projection 6b engages the notch 22 and becomes integral with the turn table 6 with respect to the direction of rotation. As long as the record disc 20 continues its rotation, the reproduction stylus 18 of the pickup P engages any one of the recorded grooves 20a, 20b, 20c, 20d, 20e and 20f and reproduces the item recorded in the grove until it reaches to the end point of sound reproduction. Since the pickup P sustains the switch contact 33, power source to the motor M is cut off at the end point of sound reproduction, and both the turn table 6 and the record disc 20 will stop their rotation.

As the location with regard to the direction of rotation of the introductory part of the record grooves 20a, 20b, 20c, 20d, 20e or 20f desired to be reproduced in the specific record disc has previously been set on the phase of rotation, by means of the locking projection 6b and the notch 22, each record groove corresponds to one of the selection poles 3a, 3b, 3c, 3d, 3e and 3f. The operator who wants to reproduce any recorded item of specific recorded groove has only to push the specific selection pole corresponding to the item. Then the specific inclined face out of the inclined faces 7a, 7b, 7c, 7d, 7e or 7f which corresponds to the pushed selection pole is urged and the stylus force releasing ring 7 will rotate. This action, in turn, rotates the stylus force releasing pole 34, raises the sound transmitting member 13 and releases the stylus force exerted on the pickup P.

In this way, the pickup P will revert back to the starting point of sound reproduction, being urged by the resilient force given by the return spring 23. At the same time, the switch contact 33 loses its support given by the pickup P and is turned ON. This permits the turn table 6 and the record disc 20 to rotate. If any one of the selection poles 3a, 3b, 3c, 3d, 3e or 3f remains being depressed since the time of starting, the stylus force releasing ring 7 is maintained in its rotated position together with its stylus force releasing pole 34 still holding the sound transmitting member 13 at its raised position. No stylus force is applied to the pickup P. Therefore, the turn table 6 and the record disc 20 only continue rotation until the stopper 6d strikes the selection pole in depressed state.

When the stopper 6d strikes the depressed selection pole, the turn table 6 and the record disc 20 are tentatively locked. Until this time, slippage between the turn table 6 and the belt 11 takes place. The introductory part of the record groove 20 selected at the phase of rotation of this tentative locking of the turn table 6 and the record disc 20, is positioned at the location onto which the pickup P descends to engage therewith.

Subsequent release of the operator's depression on the selection pole, allows the stylus force releasing ring 7 to revert back to the original phase of rotation due to the force exerted on it by the spring 9. The stylus force releasing pole 34 will also return to the original position. Accordingly, the sound transmitting member 13 will advance, urged by the stylus force spring 15 due to the absence of support. This action permits the pickup P to descend onto the recorded face of the record disc 20 to apply necessary stylus force to the record disc 20. At the same time, the stopper 6d would also be released from the support given by the selection pole. This allows the turn table 6 and the record disc 20 to rotate.

As explained above, upon completion of the reproduction of he desired item, the pickup P advances to the end point of sound reproduction and retains the switch contact 33. This cuts off power to the motor M; stopping both the turn table 6 and the record disc 20.

Figure 7:
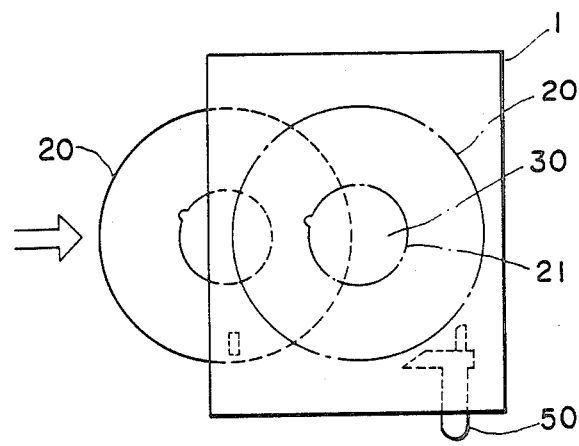
FIGS. 7 and 8 are plan views showing the manner of replacing record discs.

In order to replace a record disc 20 with another record disc 20', the second record disc 20' is inserted as shown in FIG. 7 from one side of the casing 1. Specifically, the second record disc 20' is inserted through the inlet of the record disc insertion slit 8 and is pushed into the interior until its centering hole 21 fully receives the centering projection 30.

At the midpoint of this insertion stp, the record disc will urge the stylus force releasing projection 19 to retract the reproduction stylus 18 from the level of record disc insertion slit 8. When the record disc 20 has been fully set and the record disc 20 has passed through, the stylus force releasing projection 19 descends due to absence of support by the record disc 20'.

Figure 8:
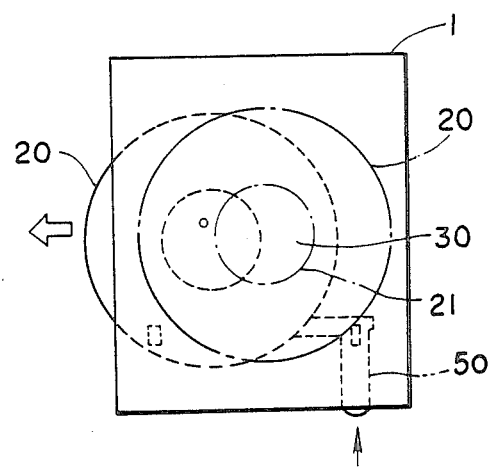

If one pushes the ejector lever 50 inward as shown in FIG. 8, forward tip end face 52 will ride on the stylus force releasing projection 19 permitting it to retract from the record disc insertion slit 8. At the same time, the pusher face 53 urges the record disc 20 in the direction so as to be ejected outside the casing. Thus, the record disc can be removed away outside the case by operator's pinching with his fingers.

According to the present invention, even in the sound reproducing device of the selective reproduction type using a selection pole, a record disc can be changed by merely inserting a desired record disc into the record disc insertion slit and pushing the ejector lever; making the device very convenient to operate and interesting as a toy and a simplified sound reproducing device.

I claim:

1. A simplified sound reproducing device having means for selectively reproducing sound recordings and means for replacing a record disc, the record disc having a centering hole at the center thereof, a plurality of recorded grooves and at least one starting point of sound reproduction, the simplified sound reproducing device comprising:

a casing;

a turn table having an outer periphery, a stopper projecting radially and outwardly from the outer periphery, and a record carrying face, the turn table capable of carrying the chosen record disc rotatably mounted within the casing;

a tone arm pivotally mounted to the casing, the tone arm located parallel to the record carrying face of the turn table and pivotal between the starting point and an ending point of sound reproduction;

means for biasing the tone arm toward the starting point of sound reproduction;

a pickup located on the tone arm;

a sound transmitting member attached to the casing and resiliently contacting said pickup to impart a stylus force. the sound transmitting member having at least one stylus force releasing projection;

a speaker diaphragm mounted on the sound transmitting member;

a plurality of selection poles corresponding in number to that of said recorded grooves, the selection poles extending through the casing and movable thereto, the selection poles disposed to surround the outer periphery of the turn table, the selection poles positioned such that depression on any one of said selection poles raises said sound transmitting member and releases the stylus force imparted to said pickup and allows its reverting back to the starting point of sound reproduction, and at the same time, said selection pole in depressed position strikes the stopper to temporarily stop said record disc under rotation so that an introductory part of the selected groove can stop at the position where said pickup can engage the introduction part;

a power source;

a motor powered by the power source capable of rotating the turn table;

an electric circuit located between the power source and the motor capable of supplying power to the motor to operate the turn table upon arrival of the pickup at the starting point of sound reproduction;

a record disc insertion slit formed within said casing such that a communication through the casing is established, the record disc insertion slit oriented in parallel with the record carrying face of said turn table, wherein the stylus force releasing projection is located at an inlet for the record disc insertion slit;

a centering projection resiliently supported in the casing located at an inner part of the record disc insertion slit such that both the stylus force releasing projection and the centering projection are positioned to intersect the record disc insertion slit;

a depressible ejector lever extending outside the casing and along the record disc insertion slit and able to eject, when depressed, both the stylus force releasing projection and the record disc under engagement with the centering projection;

a resiliently protruding record disc locking projection located on the record disc carrying face of the turn table; and a notch engageable with the record disc locking projection is disposed on the record disc.

2. A record disc replacing means for use in a selective reproduction type sound reproducing device as claimed in claim 1, wherein said stylus force releasing projection, centering projection and record disc locking projection are formed to have an inclined or convexed round face facing toward the advancing direction of said record disc.

3. A record disc replacing means for use in a selective reproduction type sound reproducing device as claimed in claim 1, wherein said ejector lever extends to the innermost end of said slit for inserting a record disc, whereby a record disc which has already been placed in set position can be ejected outward through the inlet end of said record disc inserting slit.

* * * * *